Figure 1:
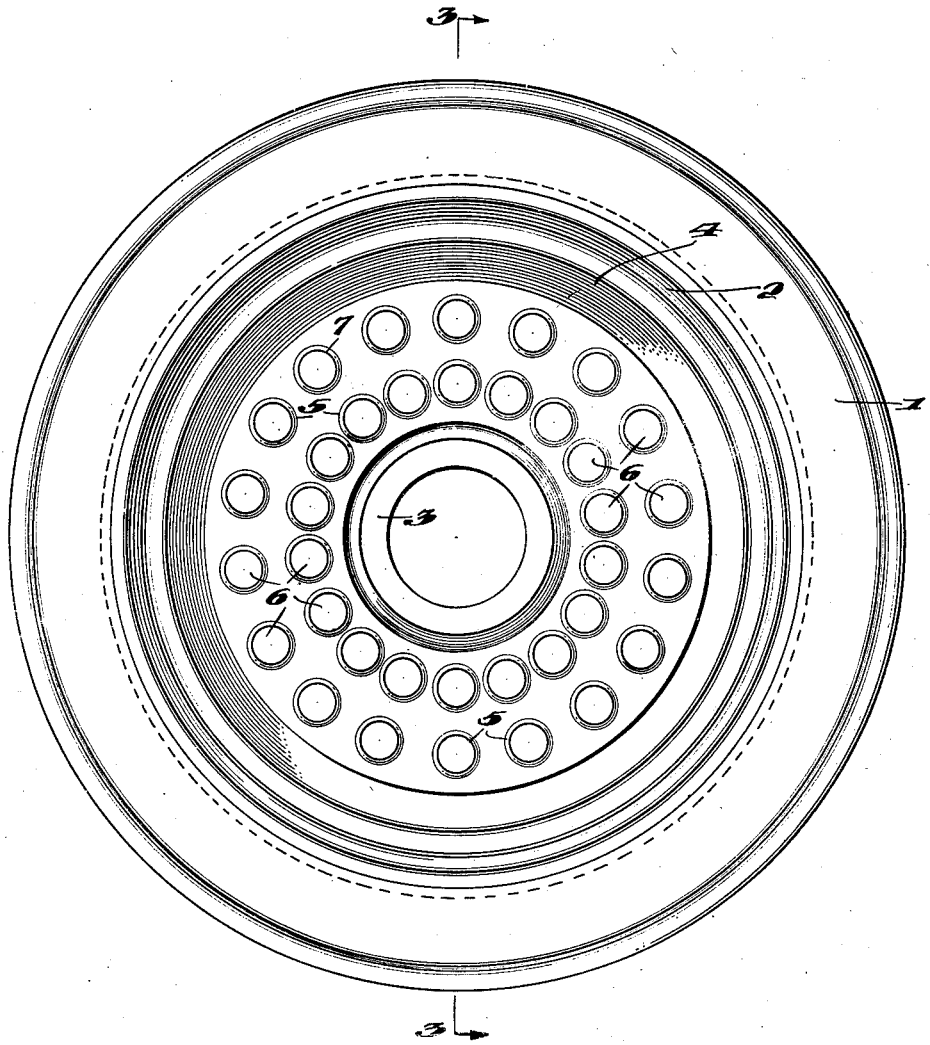

May 17, 1949.  E. H. PIRON  2,470,640
WHEEL WITH RESILIENT SPOKES
Original Filed June 17, 1943  2 Sheets-Sheet 1

Inventor
EMIL H. PIRON

May 17, 1949.　　　　　E. H. PIRON　　　　　2,470,640
WHEEL WITH RESILIENT SPOKES
Original Filed June 17, 1943　　　　　　　　2 Sheets-Sheet 2
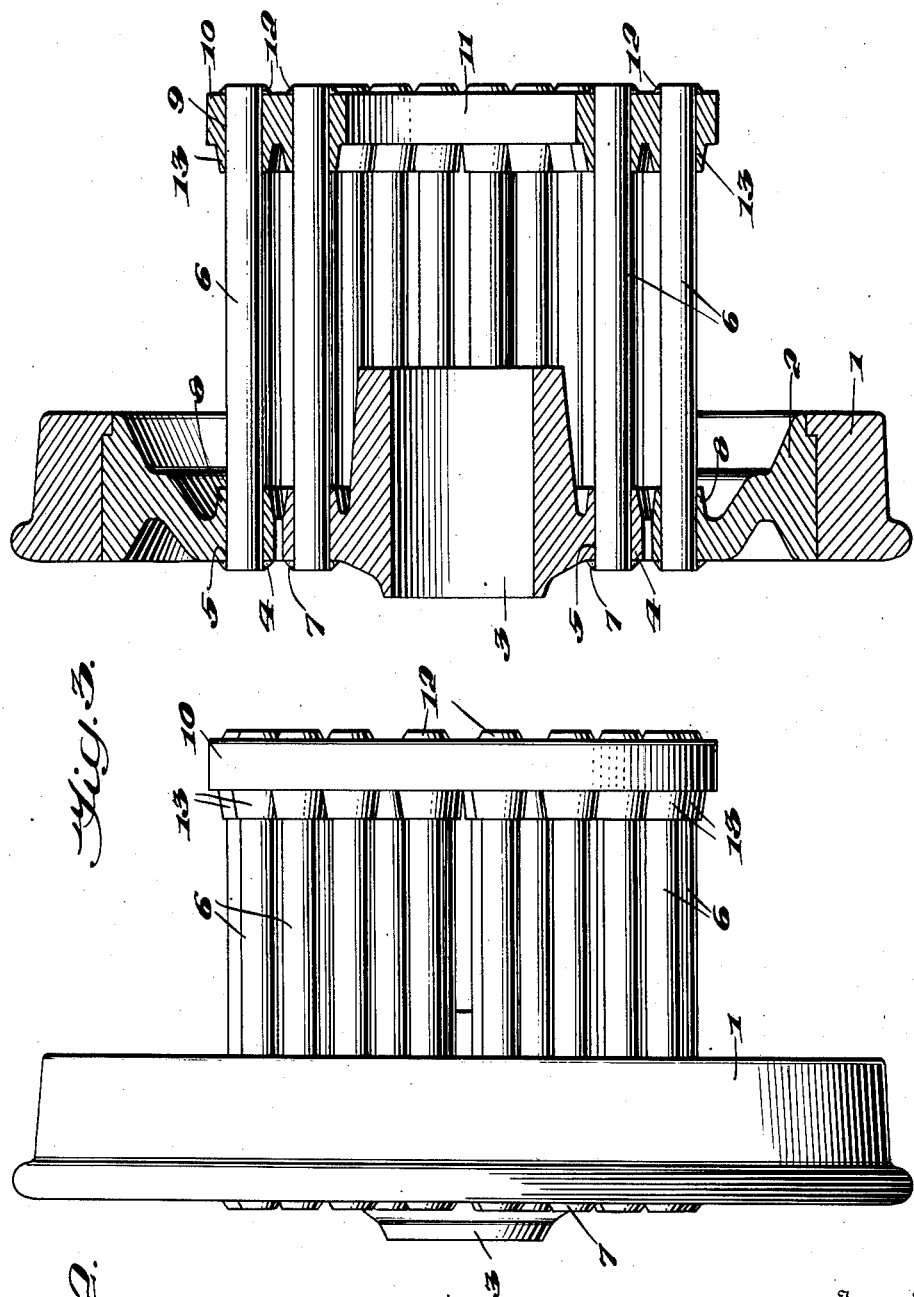

Patented May 17, 1949

2,470,640

UNITED STATES PATENT OFFICE 2,470,640

WHEEL WITH RESILIENT SPOKES

Emil H. Piron, New York, N. Y., assignor to Transit Research Corporation, New York, N. Y., a corporation of New York Substituted for application Serial No. 491,214, June 17, 1943. This application February 14, 1947, Serial No. 728,392

3 Claims. (Cl. 295—14)

This invention relates to wheels of the type employing resiliency between the tire or rim and the hub and has for its object to provide an improved metallic spoke therefor capable of yielding in a radial direction and having great stability in all other directions. This application is filed as a substitute of application Serial Number 491,214, filed June 17, 1943, now abandoned.

The resilient wheels now conventionally used on modern street railway cars employ rubber as the springing medium. The rubber is a critical material, at present, and it is necessary to employ metal as the springing medium. The principal object of this invention is to provide a wheel with metallic spokes which will yield radially, which will withstand road shocks without fracture and which will be cheaper and more durable than the conventional rubber elements.

In order to obtain the desired resiliency and lateral stability I have found that it is desirable to employ spokes of U-shape which bow out of the plane of the wheel. The spokes are made of a single bar of metal, as described in said application, and I have found that their life may be substantially improved if they are made in two parts instead of one. The stresses are highest at the region of greatest bend and the principal object of this invention is to provide a spoke which will not be subject to high stresses at this region.

More particularly the object of this invention is to provide a wheel having U-shaped spokes, the legs of the U being separate pieces coupled together.

Another object is to provide an improved type of coupling suitable for securing the spoke elements to each other and to teach the integral incorporation thereof in the hub and rim of the wheel itself.

Other objects and advantages will become hereinafter more fully apparent as reference is had to the accompanying drawings in which Figure 1 is a side elevation of my improved wheel looking to the left of Figures 2 and 3, Figure 2 is an elevation taken from a radial direction, and Figure 3 is a diametric section of the wheel taken axially.

More particularly, 1 indicates the tire or tread surface which is shrunk onto the rim portion 2. The hub 3 has a radial flange 4 which is concentric with and of somewhat less outside diameter than the inside diameter of the rim portion 2. The flange 4 and the rim portion 2 are both contained within the contour of the tire 1 and also within the contour of the hub 3.

The flange 4 and rim portion 2 are each provided with a series of holes 5, the holes of each series being equally spaced about the axis of the hub 3 and hence the two series are concentric. There are the same number of holes in each series. Through these holes 5 half spokes 6 are inserted. A small portion of the end of each half spoke projects through the flange and rim portion respectively and is welded thereto at 7. A tapered portion or collar 8 follows outwardly along each half spoke on the side of the flange and rim portion away from the weld, the half spokes being secured only at the points of weld.

The half spokes 6 are all parallel and of equal length and each extends through holes 9 in a common ring 10 having a central opening 11 through which an axle may extend. The half spokes 6 extend entirely through the ring 10 and are welded thereto at 12 at their ends. The ring 10 is provided with collar portions 13 which extend outwardly along each half spoke, the same in construction as the collars 8, and the half spokes are secured to the ring only at the points of weld.

The half spokes 6 and the ring 10 together constitute the spokes of the wheel. In operation the half spokes are each subjected to bending stresses, as are also the collars 8 and 13. The flexing of the half spokes lends resiliency between the hub and rim portion. The ring 10 is a casting or forging and is not expected to flex except as to its collar portions. These collar portions prevent a concentration of stresses at the points of attachment of the ends of the half spokes.

Various changes may be made without departing from the spirit of my invention and I therefore desire to be extended protection as defined by the appended claims.

What I claim is:

1. A spoke for a wheel having the general shape of a U, the legs having individual metallic bars parallel with each other, and a coupling joining said bars, said coupling having two parallel openings through which said bars extend, said bars each extending freely through said openings and being fixedly secured to said coupling at their outer ends.

2. A spoke for a wheel having the general shape of a U, the legs being individual metallic bars parallel with each other, and a coupling joining said bars, said coupling having two parallel openings through which said bars extend, said bars each extending entirely through said openings and being fixedly secured to said coupling only at their outer ends, said coupling having cylindrical tapered collars integral therewith and encompassing each of said spokes for a distance along their length at the side away from that to which said bars are secured.

3. A wheel comprising a hub and rim member in radially spaced relation, parallel bars extending laterally from said hub and said rim member, and a common ring into which all of said bars are secured at their ends remote from said hub and rim member, said ring having two series of openings therethrough, the centers of said series lying in concentric circles the centers of which lie in the axis of said hub, each of said openings having a collar portion projecting outwardly from said ring toward said hub and rim member, said bars extending entirely and freely through said collar portion and through said openings and being welded to said ring at their outer ends.

EMIL H. PIRON.

REFERENCES CITED

The following references are of record in the file of this patent:

UNITED STATES PATENTS

| Number | Name | Date |
|---|---|---|
| 233,222 | Findlay | Oct. 12, 1880 |